United States Patent [19]

Mizumoto et al.

[11] Patent Number: 5,080,195
[45] Date of Patent: Jan. 14, 1992

[54] METHOD OF SUPPLYING LUBRICANT AND APPARATUS FOR THE SAME

[75] Inventors: Muneo Mizumoto, Tsuchiura; Koji Kato, Sendai; Hiroshi Inoue, Ibaraki; Nobuo Tsumaki, Ushiku, all of Japan

[73] Assignees: Hitachi, Ltd., Tokyo, Japan; Koji Kato, Sendai, Japan

[21] Appl. No.: 454,355

[22] Filed: Dec. 21, 1989

[30] Foreign Application Priority Data

Dec. 23, 1988 [JP] Japan ................... 63-323331

[51] Int. Cl.⁵ .............................. F01M 9/00
[52] U.S. Cl. ..................... 184/6.4; 184/6.1; 184/104.1; 384/448; 384/463
[58] Field of Search ............ 184/5, 5.1, 6.1, 6.4, 184/104.1, 6.12, 98, 99; 384/625, 448, 463; 118/724; 340/825.72

[56] References Cited

U.S. PATENT DOCUMENTS

| | | | |
|---|---|---|---|
| 2,293,527 | 8/1942 | Atlee | 384/463 |
| 3,674,112 | 7/1972 | Roberts | 184/6.1 |
| 3,675,978 | 7/1972 | McKelvey | |
| 3,843,962 | 10/1974 | Bogue | 384/463 |
| 4,011,927 | 3/1977 | Smith | 184/26 |
| 4,381,824 | 5/1983 | Pastusek | 175/229 |
| 4,446,460 | 5/1984 | Tholl et al. | 340/825.72 |
| 4,499,464 | 2/1985 | Knox et al. | 340/825.72 |
| 4,527,661 | 7/1985 | Johnstone et al. | 184/6.1 |

FOREIGN PATENT DOCUMENTS

| | | |
|---|---|---|
| 78420 | 5/1983 | European Pat. Off. |
| 288941 | 11/1988 | European Pat. Off. |
| 2158998 | 5/1973 | Fed. Rep. of Germany ....... 184/6.1 |
| 2034417 | 6/1980 | United Kingdom |

OTHER PUBLICATIONS

Patent Abstracts of Japan—vol. 9, No. 95 (E-310) (1818) Apr. 24, 1985 JP-A-59 221949 Hitachi, Dec. 13, 1984.
Patent Abstracts of Japan vol. 12, No. 346, (M-742) (3193) Sep. 16, 1988 and JP-A-63 105220 (Toshira Corp. May 10, 1988.

*Primary Examiner*—Ira S. Lazarus
*Assistant Examiner*—Alan B. Cariaso
*Attorney, Agent, or Firm*—Antonelli, Terry Stout & Kraus

[57] ABSTRACT

A lubricant supply source is disposed in the vicinity of a sliding or rotary portion of a machine element, and an electrical power source is intermittently driven by a controller, so as to intermittently supply lubricant from the lubricant supply source to the machine element. When required, a sensor for monitoring the operating state of the machine element, and/or a remote controller is used, so that the supply of lubricant is controlled on the basis of the signal of the sensor and/or by means of the remote controller. Consequently, lubricant can be supplied or supplemented to the machine element in accordance with necessity. Therefore, the machine element will be able to stably operate for a long time, even in relative inaccessible places which people cannot inadvertently access.

13 Claims, 14 Drawing Sheets

FIG. I
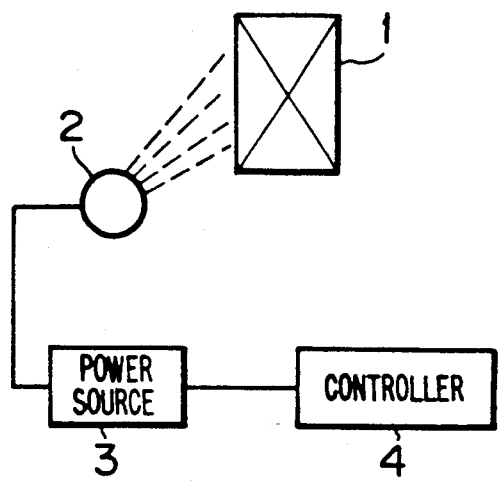
FIG. 2
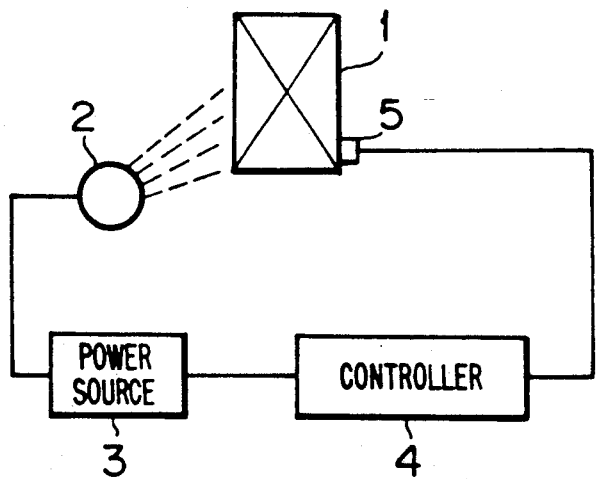
FIG. 3
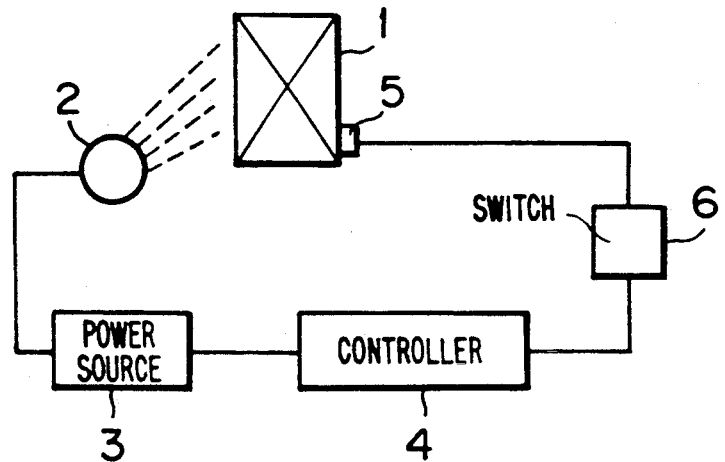

METHOD OF SUPPLYING LUBRICANT AND APPARATUS FOR THE SAME

BACKGROUND OF THE INVENTION

The present invention relates to a method and apparatus supplying lubricant to machine elements or members used in certain relatively inaccessible places so as to enable an increased service life for the machine.

There have been two ways of lubricating elements of a machine such as bearings or gears. In one of the ways, they are continuously supplied with lubricating oil, as disclosed in, for instance, Japanese Patent Examined Publication No. 45-7603. In the second way, grease, a solid lubricant or the like is injected or coated (i.e., applied in a coating) when the machine is started up.

If a element of a machine is lubricated with a solid lubricant, then when the lubricant dries up, that means the end of the life of the element. A problem arises if the machine element is used in space or in a nuclear reactor. Since replacing the machine element and other maintenance operations can be performed only with difficulty in such environments and it many sometimes be necessary to abandon the entire system along with the machine element. On the other hand, a continuous supply of 9rease, oil, etc. entails a problem in that an unnecessarily qreat amount o lubricant tends to be supplied.

SUMMARY OF THE INVENTION

An object of the present invention is to provide a method of supplying lubricant to a machine element used in a certain environment rendering maintenance operations difficult to perform, the method being capable of avoiding the drying up of the lubricant, and assuring a good lubricated condition of the machine element for a long time.

Another object of the present invention is to provide an apparatus for the application of the abovedescribed method.

In order to achieve these objects, according to the present invention, a lubricant supply source is disposed in the vicinity of a sliding or rotary portion of a machine element, and lubricant is supplied from the supply source through the operation of a controlling section whenever lubrication is necessary.

In order to supply lubricant effectively, a sensor for monitoring the operating state of the machine element is mounted thereon, and a lubricant supply system is operated on the basis of a signal from the sensor.

In order to enable the lubricant supply system to be operated from a distance, a remote controller may be used.

If the electrical power supplied to the lubricant supply source is changed at any desired intervals of time, it will be possible to supply lubricant to the machine element whenever lubrication is necessary, thereby assuring a long service life.

If the condition of the machine element is monitored of a monitoring sensor mounted on the element, it is always possible to obtain information on the state of lubrication of the element, thereby enabling lubricant to be supplied when needed. With this arrangement, it is possible to supply lubricant effectively, and to assure a highly reliable lubricated condition.

If an electrical power source for the lubricant supply source is remote-controlled by a remote controller, it is possible to obtain information on the state of lubrication of a machine element which is, for instance, in space, and to control the lubricant supply source on the ground and issue commands from the ground.

BRIEF DESCRIPTION OF THE DRAWINGS

FIGS. 1 to 5 are views schematically showing various types of the basic structure of a lubricant supply apparatus according to the present invention; FIGS. 6 through 24 illustrate various embodiments of a lubricant supply apparatuses according to the present invention, the embodiments employing a lubricant supply means which in principle comprises a solid lubricant and a means for heating and evaporating the solid lubricant, wherein FIGS. 6 and 7 are cross-sectional views of embodiments in which a ball bearing is the machine element to be lubricated;

FIGS. 8 and 9 are views of embodiments in which a sliding bearing is the machine element, FIG. 9 being a cross-sectional view;

FIGS. 10 and 11 are views of other embodiments in which a gear mechanism is the machine element;

FIG. 12 is a fragmentary view of another embodiment in which a ball screw is the machine element;

FIG. 13 is a view of still another embodiment in which a guide mechanism is the machine element;

FIG. 14 is a view of another embodiment in which a traction drive is the machine element;

FIG. 15 is a graph showing a characteristic of the operation of a machine element which is achieved by the present invention;

FIG. 16 is a view schematically showing the arrangement of a lubricant supply apparatus that is directed to the achievement of the operational characteristic shown in FIG. 15;

FIGS. 17 to 19 are views of embodiments in which a ball bearing is the machine element, FIG. 18 being an enlarged perspective view of a portion including a ball bearing;

FIGS. 20 and 21 are enlarged perspective views of ball bearings serving as the machine elements in different embodiments;

FIGS. 22 and 23 are enlarged cross-sectional views of ball bearings serving as the machine elements in other different embodiments; and FIG. 24 is a view of an embodiment in which a sliding bearing is the machine element;

FIGS. 26 to 28 illustrate embodiments of a lubricant supply apparatus according to the present invention employing a lubricant supply means which includes a lubricant delivering pump, wherein FIG. 26 is a view of an embodiment in which a ball bearing is the machine element;

FIG. 27 is a view of an embodiment in which a sliding bearing is the machine element; and FIG. 28 is a view of an embodiment in which a ball screw is the machine element;

FIGS. 29 to 32 illustrate embodiments of a lubricant supply apparatus according to the present invention employing a lubricant supply means which includes a means for mechanically pressing and coating a lubricant, wherein FIGS. 29 and 30 are views of an embodiment in which a ball bearing is the machine element, FIG. 30 being a fragmentary perspective view; and FIGS. 31 and 32 are views of an embodiment in which a sliding bearing is the machine element, FIG. 32 being a sectional view taken along the line XXXII—XXXII shown in FIG. 31.

DESCRIPTION OF THE PREFERRED EMBODIMENTS

Figure 4:
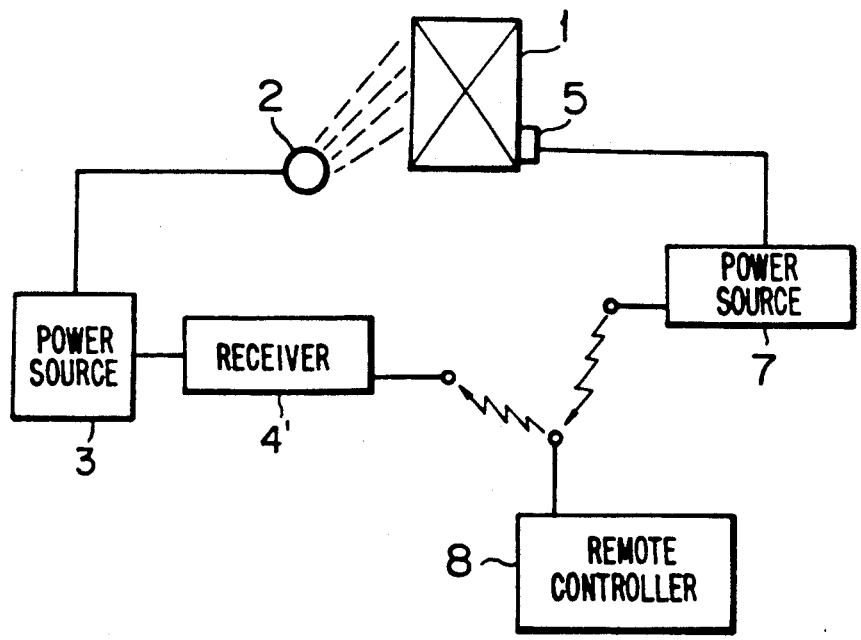

The preferred embodiments of the present invention will now be described with reference to the drawings.

Referring now to the drawings wherein like reference numberals are used throughout the various views to designate like parts, and, more particularly to FIG. 1, according to this figure a lubricant supply apparatus comprises a lubricant supply means 2 thereinafter referred to as a "tribo-coating unit" or "tribo-coating means") for supplying lubricant to all or part of a machine element 1, an electrical power source 3 for supplying electrical power to the tribo-coating unit 2, and a controller 4 for controlling the electrical power source 3. As will be described later in detail, the tribo-coating unit 2 is, for example, a means for suitably evaporating a solid lubricant, a vacuum deposition means, an ion gun, a means including a pump or the like for delivering lubricant, or a means for mechanically pressing and coating lubricant. Such a tribo-coating unit 2 intermittently supplies lubricant when the electrical power source 3 is suitably controlled by the controller 4. For this purpose, the controller 4 performs preset control functions so that lubricant is in termittently supplied from the tribo-coating unit 2 to the machine element 1, for example, at predermined intervals. Specifically, the controller 4 controls the electrical power source 3 by performing on-off control on the basis of time, or by increasing or decreasing the electrical power supplied from the power source 3. This control enables the machine element 1 to be lubricated for a long period. Since lubrication is performed whenever the machine element 1 is in need of lubricant, it is possible to achieve a longer life for the machine element 1.

The embodiment shown in FIG. 2 is distinguished in that a sensor means 5 is mounted on the machine element 1 in order to check the operating state of the machine element 1. The sensor means 5 allows the monitoring of the condition of the machine element 1 and outputs a signal indicative of the detected operation state. On the basis of the level of the detection signal, the controller 4 causes the operation of the electrical power source 3 so as to supply lubricant. For example, the sensor means 5 may, for example, be a temperature sensor, a vibration detector and a torque detector. If a temperature sensor is used as the sensor means 5, in the event that the machine element 1 is not well lubricated, a rise in temperature due to generation of heat is detected. Thus, lubricant is supplied to the machine element 1 through the operation of the controller 4 before any damage is caused to the machine element 1. In this way, the structure shown in FIG. 2 enables the supply of a minimum necessary amount of lubricant whenever lubrication is necessary, thereby assuring high reliability of the machine element 1, and achieving a long service life thereof.

The embodiment shown in FIG. 3 is distinguished by the addition of a switch 6 to the apparatus for supplying lubricant as shown in FIG. 1 or 2 in order to open and close a circuit connecting the sensor means 5 and the controller 4. This structure enables the method of and the apparatus for supplying lubricant to be performed with a higher level of freedom than what is possible with the structure shown in FIG. 1 or FIG. 2.

In the embodiment shown in FIG. 4, a remote controller 8 and a controller provided with a receiver 4' supplies lubricant in response to a command issued from a distant location. For instance, the sensor means 5 has an amplifier provided with an electric power source so as to allow the operating state of an equipment element which is, e.g., within a nuclear reactor, to be monitored at a distance on the ground, and, supply when necessary, lubricant to the machine element 1. This structure enables information on the state of the machine element 1 to be always obtained, thereby enhancing the level of reliability.

Figure 5:
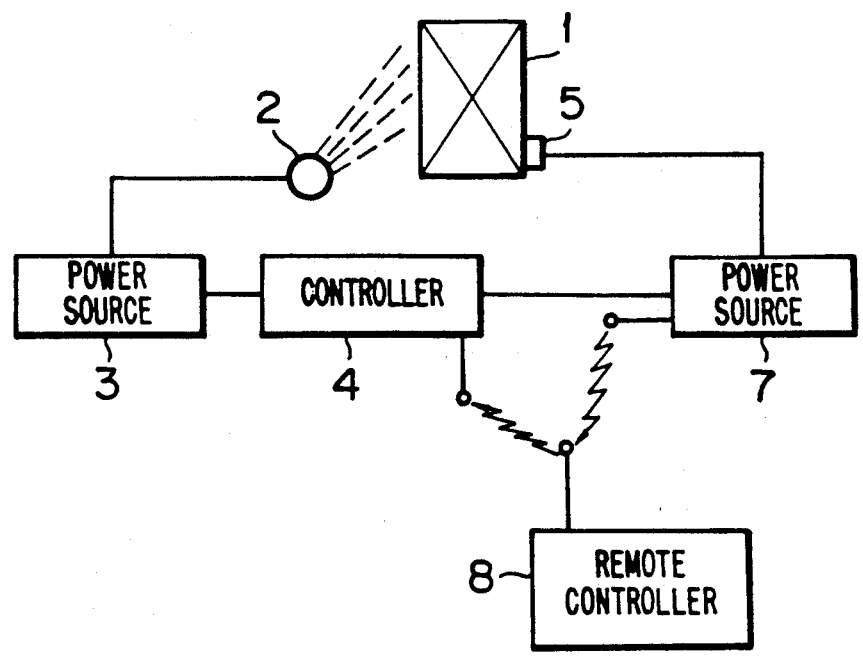

As shown in FIG. 5, a signal output from the sensor means 5 having an amplifier and electrical power source 7 is continuously monitored at a distant location, and, whenever necessary, the supply of lubricant is effected by interrupting the feedback control of the sensor means 5, the controller 4, and the electrical power source 3. With this structure, therefore, the lubricant supplying operation can be effected with ease from a distant location.

The apparatuses shown in FIGS. 6 to 14 employ a tribo-coating unit which in principle includes a solid lubricant and a heating and evaporating means.

Figure 6:
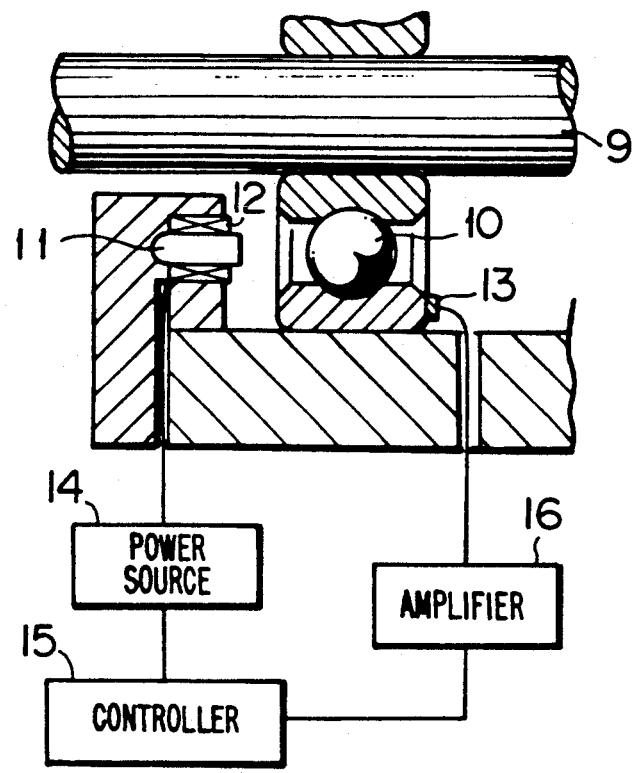

FIG. 6 shows an embodiment in which the machine element is a ball bearing 10 and the tribo-coating unit includes a vacuum deposition source 11. An electrical power source 14 is provided for the vacuum deposition source 11, with a controller 15 and amplifier 16 with power source being provided for a sensor means 13. Although the vacuum deposition source 11 is combined with a heater 12 for causing the evaporation of the source 11, an electron beam may be alternatively used to get the same effects. A plurality of vacuum deposition sources 11 may be provided. An arrangement where Ag and Au, which are often used to form solid lubricants, are simultaneously or alternatively deposited is preferred to an arrangement where Ag or Au, forming a solid lubricant, is used singly. This is because the first arrangement enables enhanced effect of lubrication. As stated before, the sensor means 13 may be any of a temperature sensor, a vibration detector and a torque detector which can be handled with ease.

Figure 7:
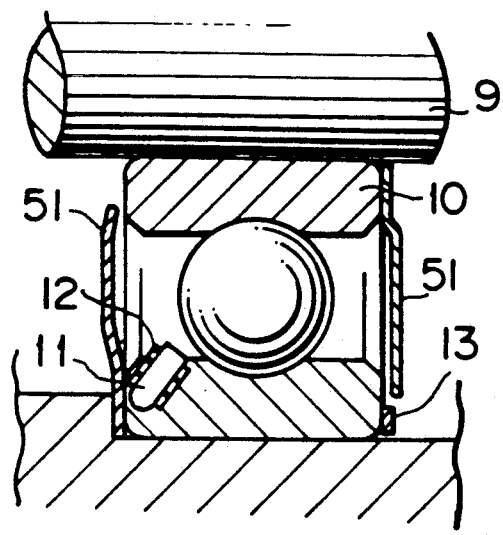

The embodiment shown in FIG. 7 is similar to that shown in FIG. 6 in that the machine element is a ball bearing 10, but it is distinguished in that a small unit including a vacuum deposition source 11 is partially embedded in the stationary ring, i.e., the outer ring of the bearing 10. If the outer ring is on the driving side, the small unit including the deposition source 11 may be disposed on the inner ring so as to facilitate accommodation of lead wires through which current flows. There is another difference in FIG. 7 that a sealing means 51 is provided and disposed on either side of the ball bearing 10. This allows lubricant from the small vacuum deposition source 11 to be efficiently deposited on the pertinent portion. Thus, this embodiment makes the ball bearing 10 a compact bearing incorporating deposition unit and obtaining a high efficiency of deposition.

Figure 8:
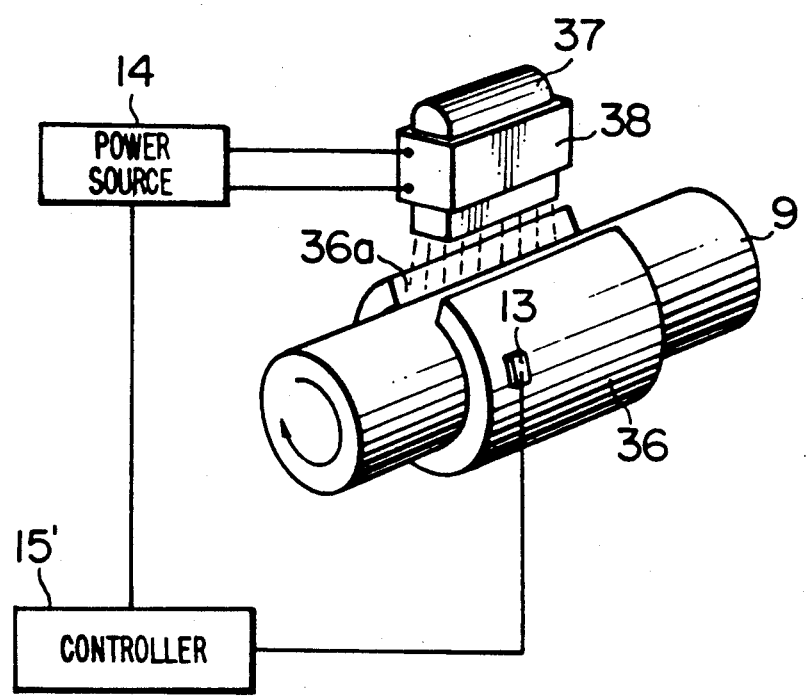

In the embodiment shown in FIG. 8, the tribo-coating unit includes a rectangular vacuum deposition source 37, and electrical power source 14, and a controller 15' including an amplifier with an electrical power source for the sensor 13. A bearing sleeve 36 of a sliding bearing is formed therein with an axial slit 36a. The rectangular vacuum deposition source 37 is disposed along and in opposition to the axial slit 36a so that the evaporated lubricant can be deposited on the surface of the rotary shaft 9. The sensor means 13 used in this embodiment is a vibration detector. However, the sensor 13 may alternatively be a temperature sensor or a torque detector. In the embodiment of FIG. 8, the rectangular vacuum deposition source 37 is combined with a heater 38 for evaporating lubricant. However, the source 37 may alternatively be heated by an electron beam or a laser beam. With the arrangement of this embodiment, even if the sliding bearing 36 is used in a relatively inaccessible location, the bearing 36 can be lubricated, whenever necessary, by depositing lubricant, e.g., lubricant from a solid lubricant, on the surface of the rotary shaft 9 along the full axial length of the sliding bearing 36, while the condition of the sliding bearing 36 is monitored by means of the sensor means 13 at all times or at suitable timing.

Figure 9:
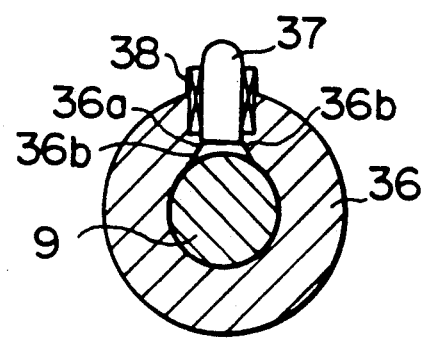

The embodiment shown in FIG. 9 is a modification of the embodiment shown in FIG. 8 by integrating the unit including the rectangular vacuum deposition source 37 and the bearing sleeve 36 of the sliding bearing. This arrangement enables the achievement of a compact structure, while reducing the risk of lubricant leaking to the outside of the bearing 36. Further, if edge portions 36b on the slit 36a of the bearing sleeve 36 facing the surface of the rotary shaft 9 are cut, as shown in FIG. 9, this helps vacuum-deposited lubricant to firmly stay on the surface of the rotary shaft 9 without becoming separated. If a plurality of vacuum deposition sources 37 of different metals are circumferentially arranged, this makes it possible to deposit a plurality of different metals, hence, to deposit an alloy lubricant.

Figure 10:
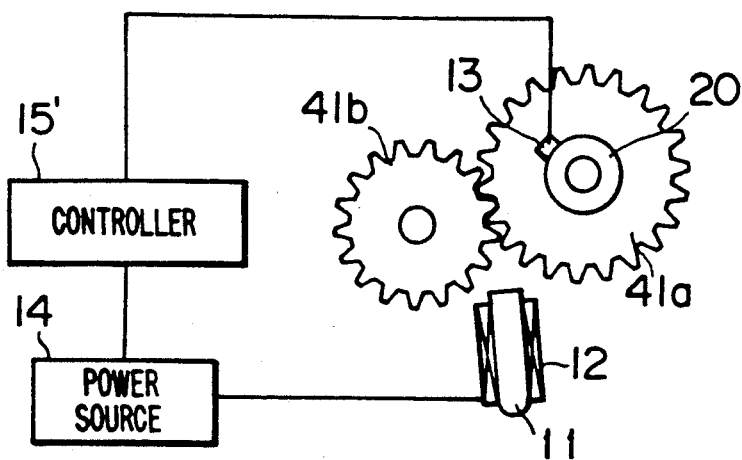
Figure 11:
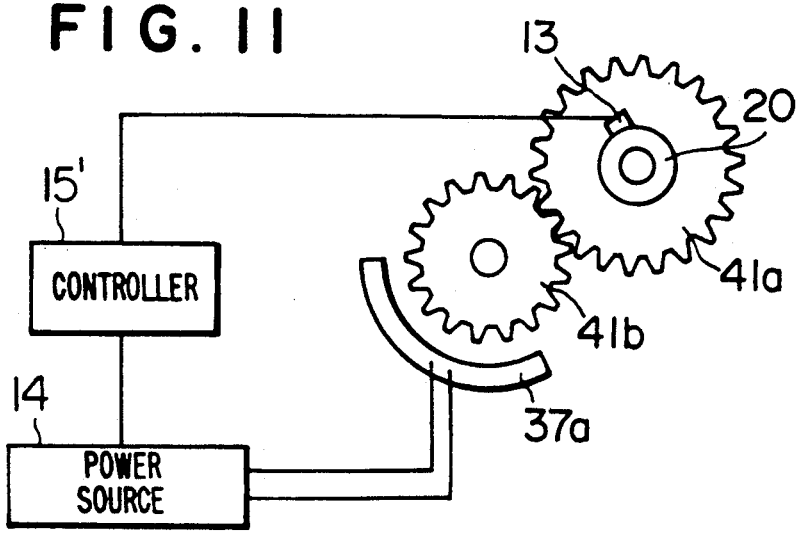

The embodiments shown in FIGS. 10 and 11 are differ from those shown in FIGS. 6 through 9 in that a gear serves as the machine element In the embodiment shown in FIG. 10, the tribo-coating unit includes a vacuum deposition source 11, an electrical power source 14, controller 15' and a heater 12 for heating the source 11. The use of the heater 12 is a mere example, and it may be substituted with either heating by an electron beam or radiation heating by a laser beam. The vacuum deposition unit 11 is disposed in opposition to the portion at which gears 41a and 41b are in mutual meshing engagement, so as to deposit lubricant on the portion of the gears where they are in mutual contact. In this embodiment, the vacuum deposition unit including the vacuum deposition source 11 may be substituted by an ion gun described hereinbelow, and similar results will be provided. In either case, it is possible to ensure a long life of the gear mechanism.

In the embodiment shown in FIG. 11, a circular-arc vacuum deposition source 37a is a part of the tribo-coating unit, and is disposed along an outer periphery of a gear 41b. The heating means combined may be any of a heater, an electron beam and a laser beam. Lubricant which has evaporated from the source 37a deposits on the portion where the gear 41b is in meshing engagement with another gear 41a, thereby allowing these gears 41a and 41b to maintain smooth meshing engagement. If another circular-arc vacuum deposition source 37a is provided on the side of the other gear 41a, the lubricated condition of the gears 41a and 41b can be enhanced. The arrangement shown in FIG. 11 also ensures that the necessary amount of lubricant is supplied, whenever necessary, to the gears, thereby enabling the achievement of a considerably long life of the gears.

Although not shown, in each of the embodiments shown in FIGS. 10 and 11, if a plurality of vacuum deposition unit 37, 37a are provided to deposit a plurality of different lubricants, it is possible to supply a mixture of lubricants, thereby achieving a high level of lubrication.

Figure 12:
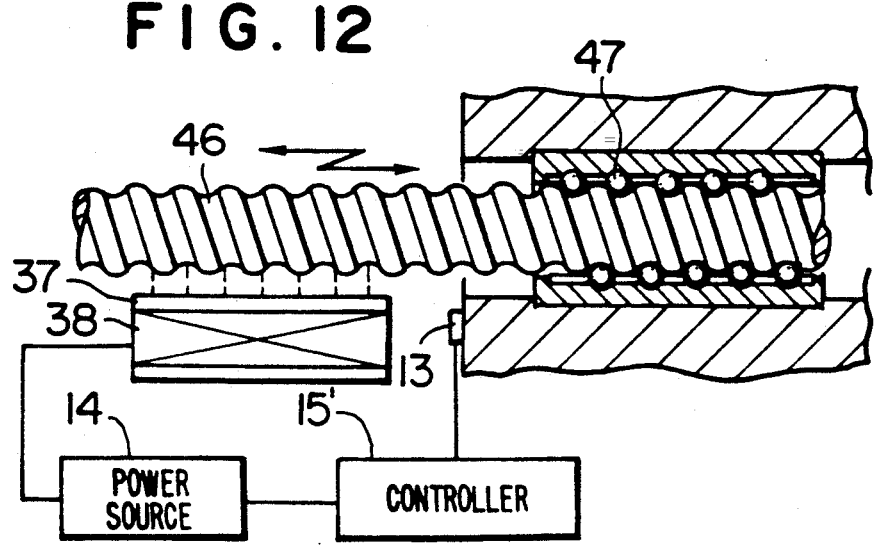

FIG. 12 shows an embodiment in which the machine element is a ball screw 46, and the tribo-coating unit includes a vacuum deposition source 37 and a heater 38 for causing the evaporation of the source 37. The heater 38 may be substituted with an electron or laser beam. A very effective lubrication can also be achieved if an ion gun is used in place of the vacuum deposition source 37 so as to inject nitrogen ions, or if the vacuum deposition source 37 is used together with an ion gun so as to inject lubricant mixed with ions.

Figure 13:
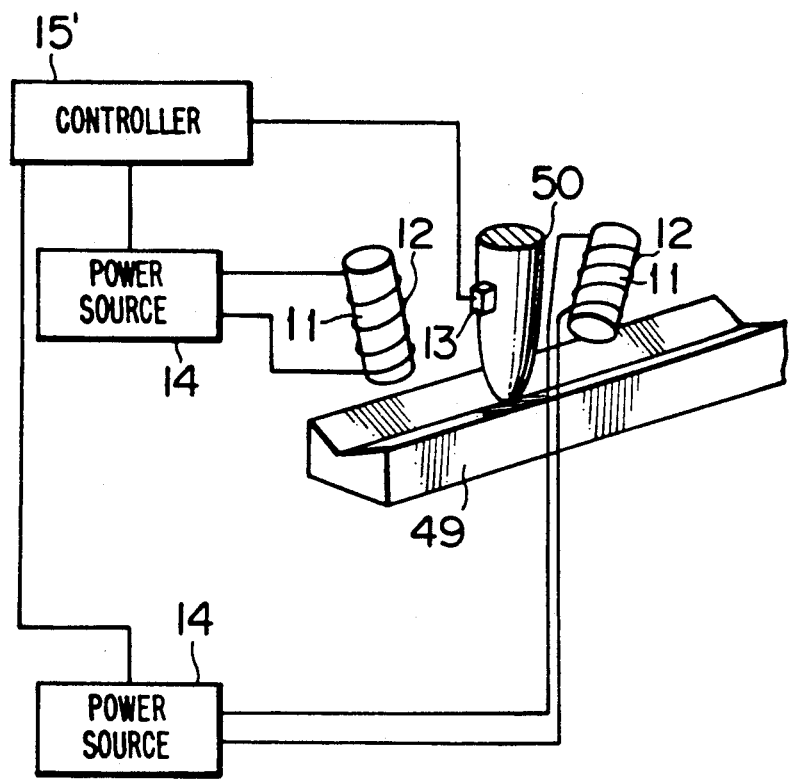

FIG. 13 shows an embodiment in which the machine element is a mechanism of guide having a guide rail 49 and a drive pin 50. A plurality of tribo-coating units are used, with each unit including a vacuum deposition source 11 and a heater 12 for causing the evaporation of the source 11. The heater 12 may be replaced by an electron or laser beam. Effective lubrication can also be achieved if the vacuum deposition sources 11 are replaced with ion guns. In any of these cases, the plurality of tribo-coating units moves in unison with the drive pin 50. If the units are disposed in either of the advancing and retracting direction of the drive pin 50, tribo-coating can be effected during movement in either of these directions, thereby achieving improved effect of lubrication. The tribo-coating unit may alternatively be a means for pressing a solid lubricant on the surface of the guide rail 49 and thereby coating lubricant, with similar effect of lubrication being provided. This embodiment is thus directed to the achievement of a long service life of the guide mechanism.

Figure 14:
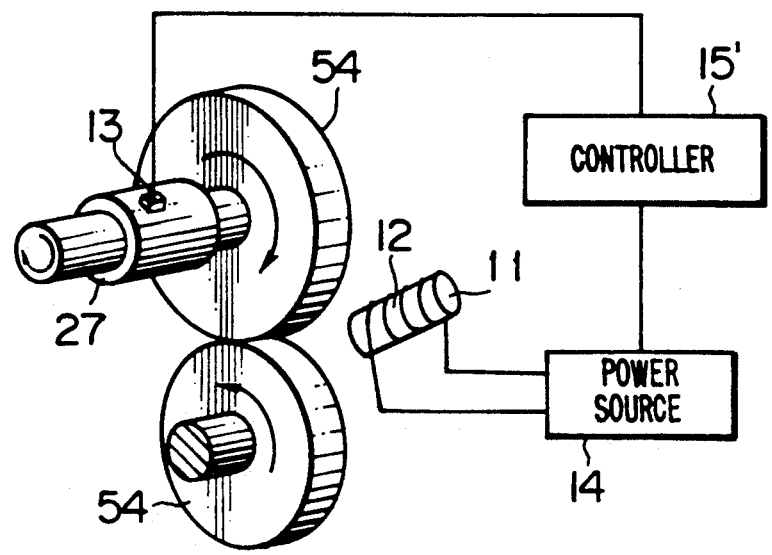

FIG. 14 shows an embodiment in which the machine element is a traction drive, and the tribo-coating unit includes a vacuum deposition source 11 and a heater 12 for heating the source 11. The heater 12 may be substituted with heating by an electron or laser beam. The vacuum deposition source 11 may alternatively be any of an ion gun, an oil supply device and a solid lubricant pressing and coating device. If the coating unit is of the type which effects pressing and coating of or vacuum deposition of a solid lubricant, a plurality of such units may be provided so as to simultaneously apply a plurality of materials. This makes it possible to achieve the effect of a mixed lubricant, thereby achieving an improved level of lubrication. This embodiment is thus capable of achieving a long service life of the traction drive.

Figure 15:
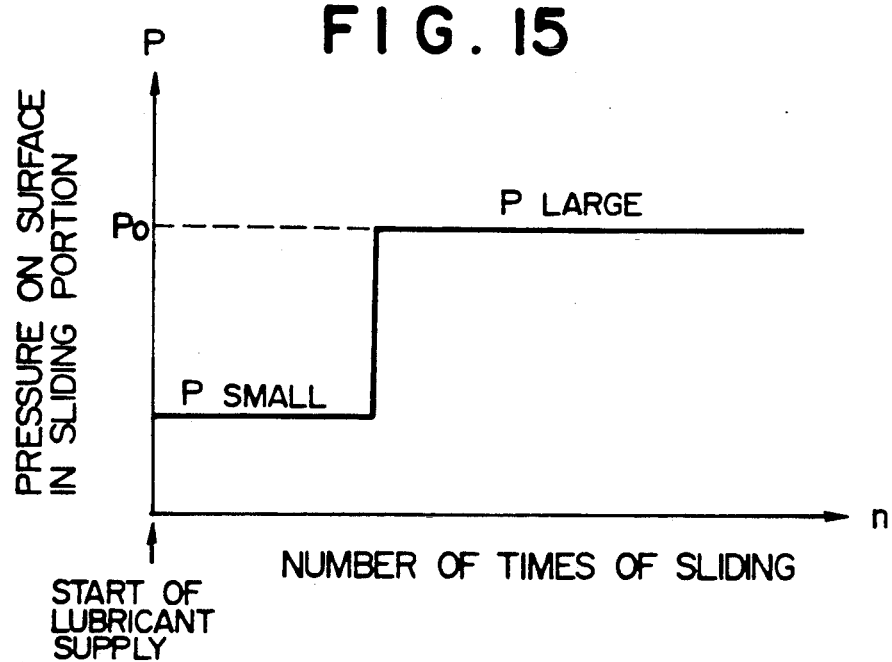

In each of the embodiments shown in FIGS. 1 to 14, lubrication may be performed in the following manner. As shown in FIG. 15, for a certain period after supplying of lubricant, the pressure P acting on the surfaces in the portion of mutual contact, the surfaces relatively sliding, or the surfaces in relative rotation is kept small, and, thereafter, the pressure P is returned to a level $P_o$ which is assumed during normal operation. If lubrication is performed in this manner, it is possible make lubricant, in particular lubricant from a solid lubricant, to firmly adhere to the sliding surfaces, thereby enabling the achievement of a long service life.

Figure 16:
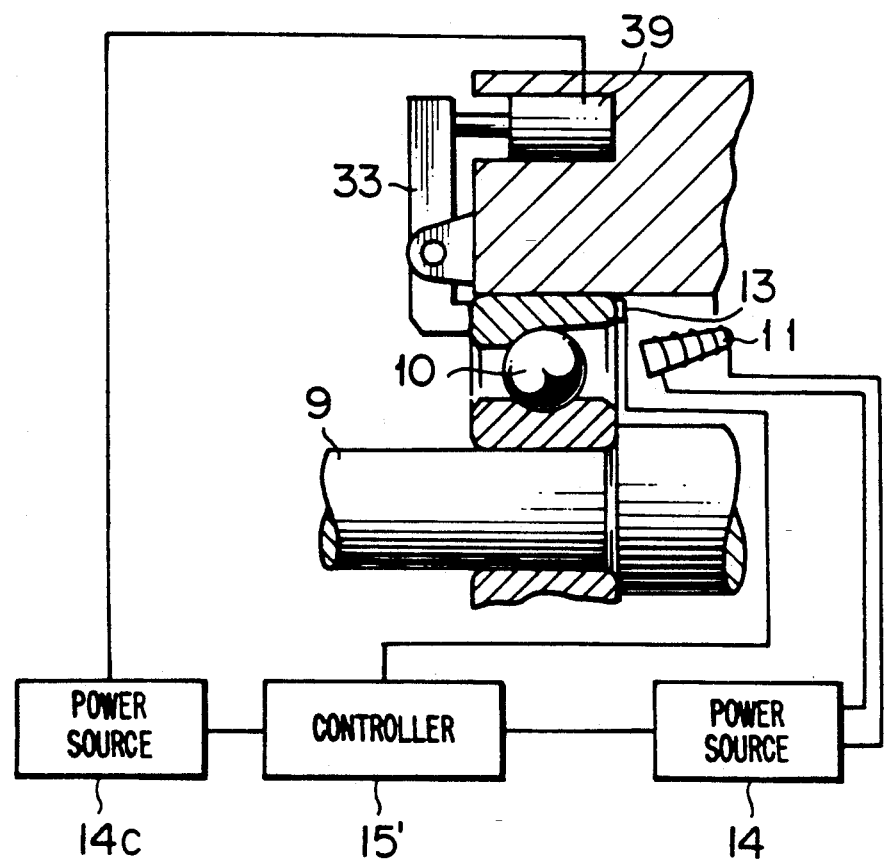

FIG. 16 shows an example of the arrangement for controlling the pressure applied on the pertinent surfaces in the manner shown in FIG. 15. In this embodiment, a ball bearing 10 serves as the machine element. This arrangement includes a mechanism in which the tip of a pressing arm 33 is pressed against the outer ring of the ball bearing 10 by the action of a pressure piston 39 operable by a power source 14c. The force with which the piston 39 operates is increased or decreased so as to increase or decrease the thrust load. Thus, the mechanism is capable of adjusting the load acting between the rolling members and the outer or inner ring of the ball bearing 10. The pressure piston 39 which is used to actuate the pressing arm 33 may be replaced by a motor, an electromagnetic force generating means or the like. In the arrangement shown in FIG. 16, a vacuum deposition source 11 is heated by electrical power source 14 which operates with a signal from a sensor means 13. Thereafter, during deposition, the load added by the piston 39 is maintained at a small value. After the completion of the deposition or in late stage of the deposition, the load added by the pressure piston 39 is increased, and the mechanism works in normal operation. If the piston 39 is controlled in the above-described manner, it is possible to effect the surface pressure control illustrated in FIG. 15. This manner of control may be applied to any of the tribo-coating units already described with reference to FIGS. 6 to 14. In this case, it is possible to obtain improved effect of the lubricant used, and to further increase the life of the mchine element.

The apparatuses shown in FIGS. 17 to 24 employ a tribo-coating unit which includes, in principle, a laser beam for evaporating a solid lubricant.

Figure 17:
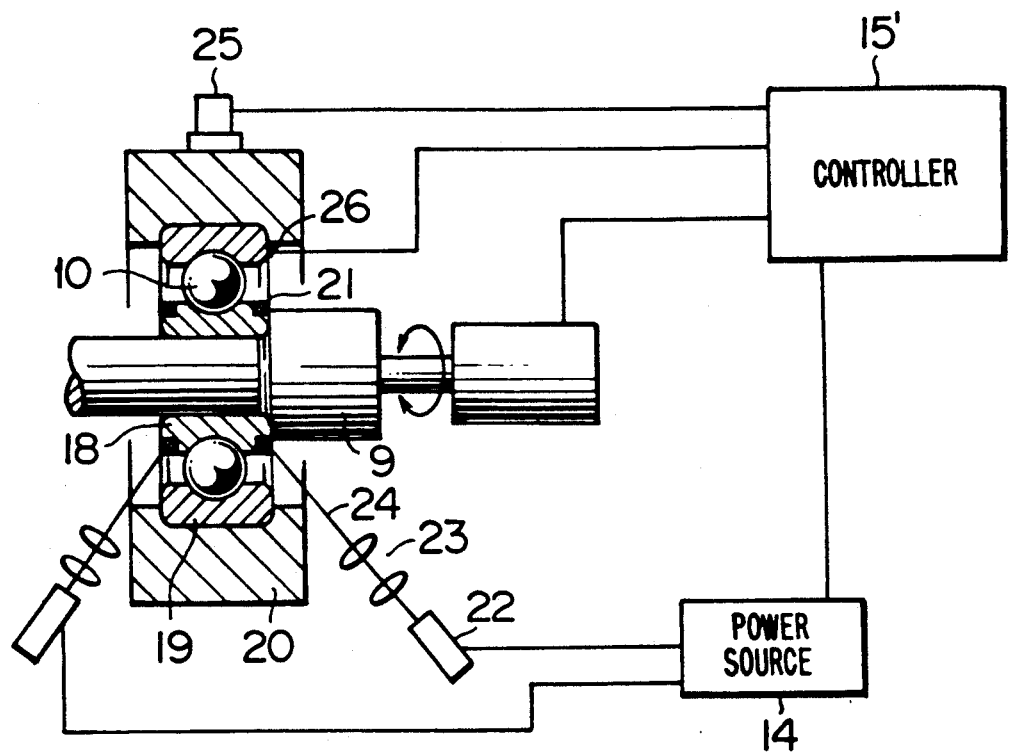

FIG. 17 shows an embodiment in which the machine element is a ball bearing 10, and the tribo-coating unit includes vacuum deposition sources 21 formed of a solid lubricant. Laser beams 24 are used as a means for evaporating the solid lubricant forming the source 21. If the solid lubricant 21 is circumferentially embedded in the outer or inner ring of the bearing 10 which rotates, the solid lubricant 21 can be evaporated evenly in the circumferential direction without requiring the laser beams 24 to be driven. A vibration detector 25, a temperature sensor 26 and a torque detector 27 are mounted at suitable positions to serve as sensors for monitoring the operating state of the machine element If the sensor means thus comprises sensors of three different types, it is possible to positively obtain information on the operating state of the machine element, thereby enabling appropriate supply of lubricant.

Figure 18:
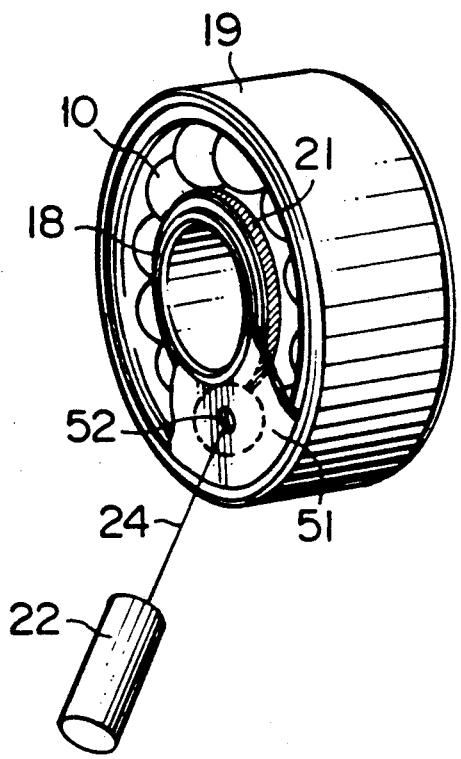

The embodiment shown in FIG. 18 is a modification of the apparatus for supplying lubricant to the ball bearing 10 shown in FIG. 17 by providing sealing plates 51 (only one of which is shown) on either side of the bearing 10 so as to prevent leakage of lubricant from the solid lubricant 21 evaporated by laser beams 24. Each sealing plate 51 is formed of a bore 52 through which the laser beam 24 passes to be projected onto the solid lubricant 21. With the above-described arrangement, lubricant from the solid lubricant 21 can be efficiently deposited while being prevented from leaking to the outside of the ball bearing 10. In addition, the provision of the sealing plates 51 prevents lubricant from contaminating those machine portions neighboring the bearing 10.

Figure 19:
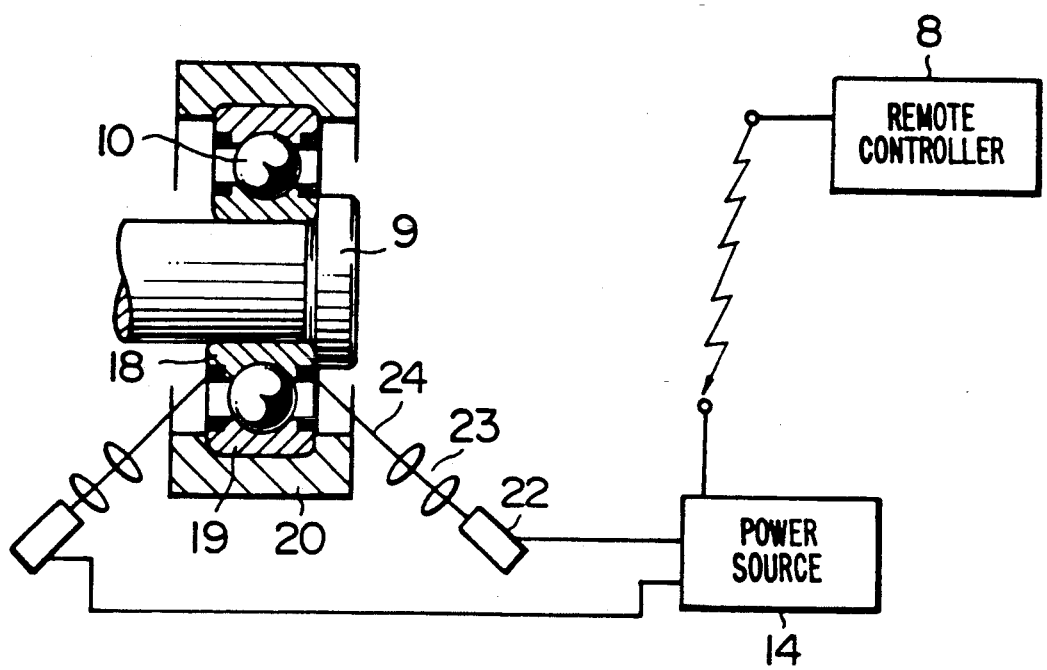

FIG. 19 shows another modification of the embodiment shown in FIG. 17 in which a power source 14 is controlled by a remote controller 8. This embodiment enables the laser beams to be controlled from a distant location in order to effect a required supply of lubricant from the solid lubricant 21.

Figure 20:
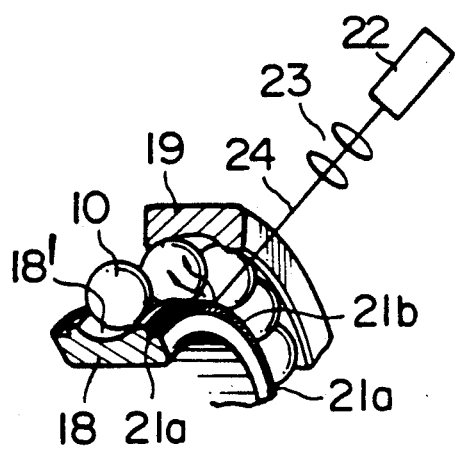
Figure 21:
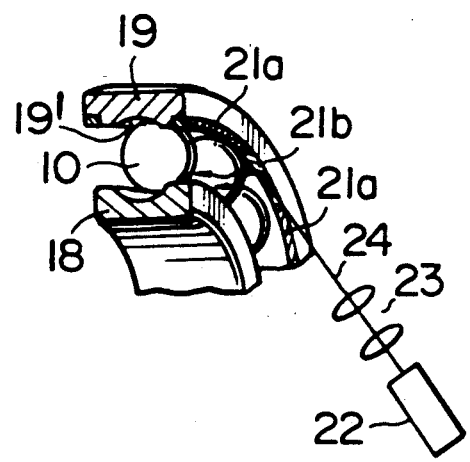

FIGS. 20 and 21 show embodiments which are similar to those shown in FIGS. 17 to 19 in that the machine element is a ball bearing and that laser beams serve as a solid lubricant evaporating means. However, those embodiments differ in that solid lubricants 21 and 21b of a plurality of different types are embedded in circumferential edge portions of the outer or inner ring of a ball bearing. If, for exaple, Ag is used to form the solid lubricant 21a while Au is used to form the other solid lubricant 21b, as the ball bearing rotates, Ag and Au are evenly evaporated by laser beams 24, thereby enabling an alloy lubricant to be deposited. In this embodiment, if a sealing plate is provided on either side of the bearing, lubricant can be efficiently deposited without the risk of contaminating the neighboring portions of the machine.

Figure 22:
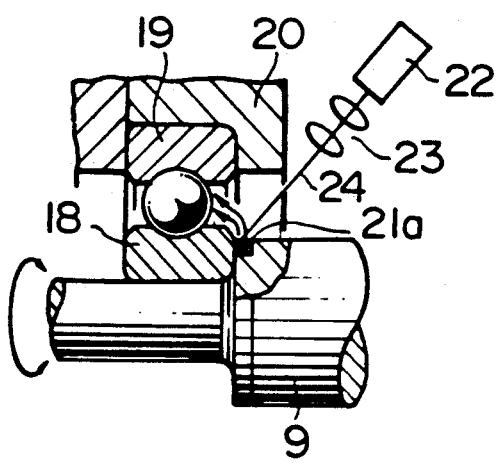
Figure 23:
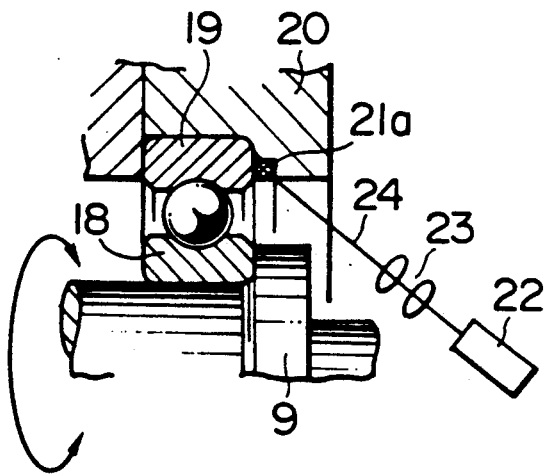

FIGS. 22 and 23 show embodiments which are similar to those shown in FIGS. 17 to 19, but which differ in that a solid lubricant 21 is not embedded in the outer or the inner ring 18 or 19 of the ball bearing serving as the machine component. Instead, the solid lubricant 21 is embedded in portions in the vicinity of the bearing. In the embodiment shown in FIG. 22, a solid lubricant 21a is embedded in a portion of the associated rotary shaft 9. In the embodiment shown in FIG. 23, a solid lubricant 21a is embedded in an inner peripheral surface of a sleeve 20 of the rotary outer ring. In these embodiments, the solid lubricant 21 is evaporated by a laser beam 24 in accordance with necessity. If sealing plates are provided on either side of the bearing, lubricant can be efficiently supplied from the solid lubricant 21 to the driving portion without the risk of lubricant leaking to the outside of the sealing plates.

Figure 24:
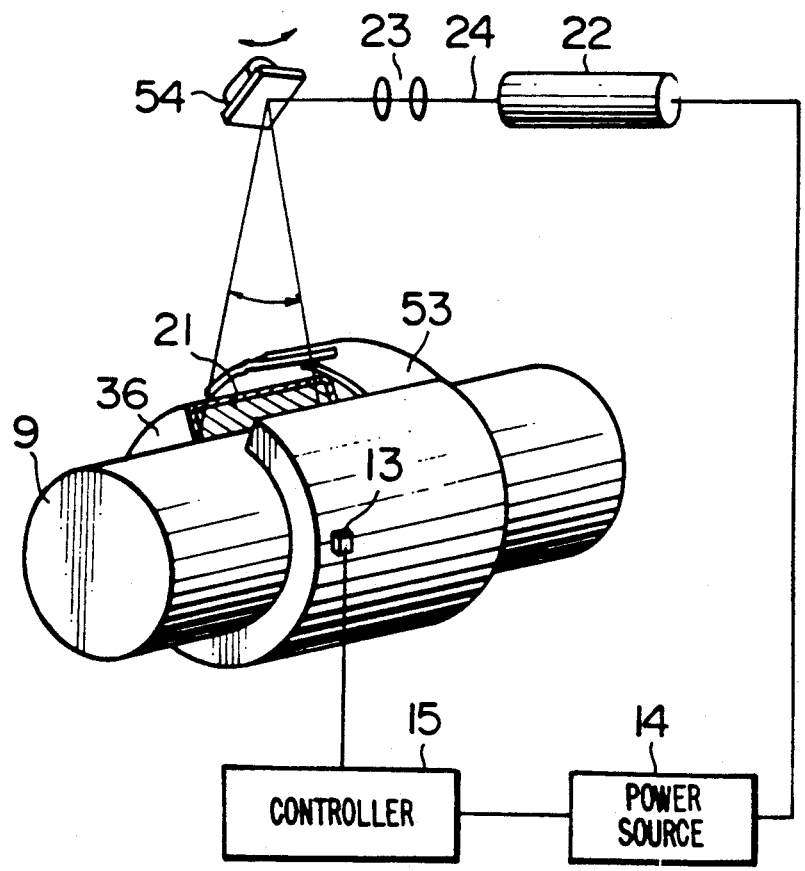

In the embodiment shown in FIG. 24, a solid lubricant 21 is fixed to the edge portions of an axial slit formed in the sleeve 36 of a sliding bearing. The solid lubricant 21 is heated and evaporated by a laser beam 24. The provision of a shielding plate 53 makes it possible for lubricant to be effectively deposited on the surface of the rotary shaft 9 while being prevented from leaking to the outside of the sliding bearing.

Figure 25:
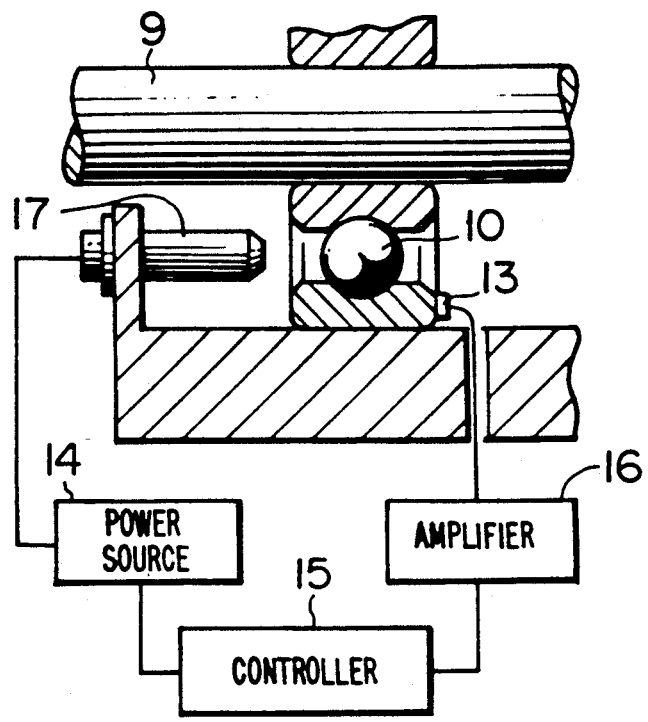
FIG. 25 illustrates an embodiment of a lubricant supply apparatus according to the present invention employing a lubricant supply means which comprises an ion gun.

The embodiment shown in FIG. 25 from those shown in FIGS. 6 to 24 in that an ion gun 17 is used as a tribo-coating means. In the example illustrated, the machine element to be lubricated is a ball-and-roller bearing 10. If injected ions such as nitrogen ions are combined with one or more lubricants such as Ag, Au, Ti and/or Pb, it is possible to effect the coating of a firm lubricant film.

Figure 26:
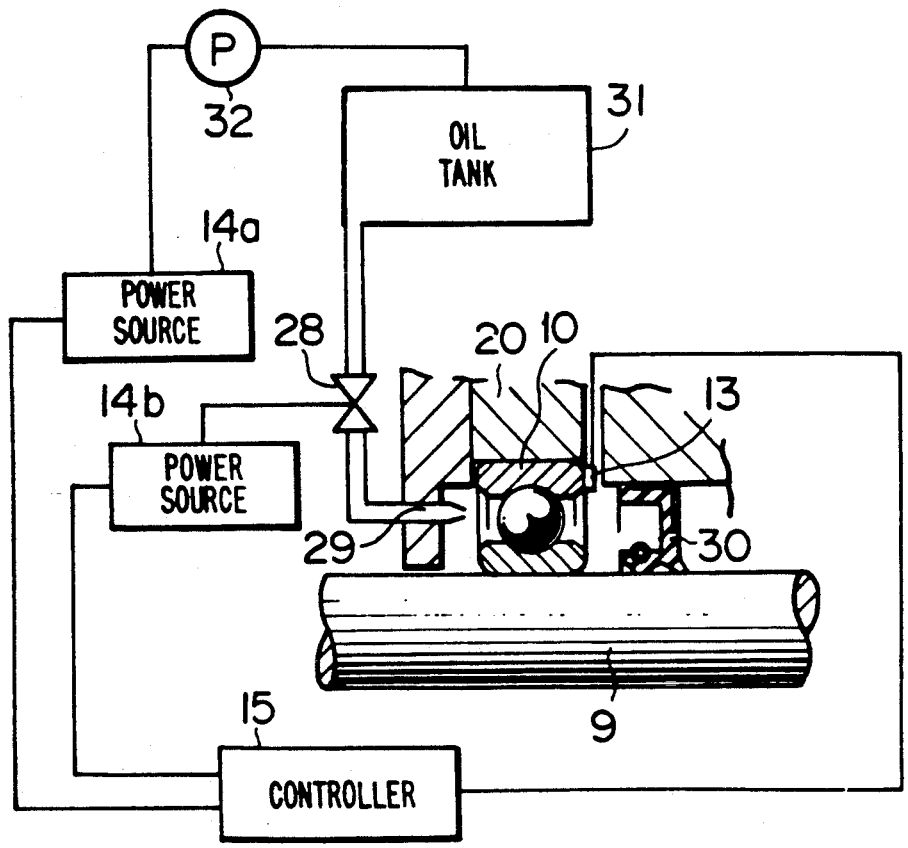

FIG. 26 shows an embodiment in which the machine element is a ball bearing 10, and the tribo-coating source is oil. In this embodiment, a pressure pump 32 pressurizes the inside of an oil tank 31, and it is connected to a pump power source 14a. A valve 28 is provided in an oil supply pipe 29 extending from the oil tank 31, and it is connected to a valve power source 14b. A controller 15 controls the pump power source 14a and the valve power source 14b on the basis of a signal output from a sensor means 13. An oil seal is used as a means for preventing any leakage of oil to the outside of the bearing 10. This sealing means may not be an oil seal, and it may alternatively be a non-contact seal such as a labyrinth seal. With the above-described arrangement, the necessary amount of oil is supplied to the bearing 10 whenever lubrication necessary, thereby enabling the achievement of a long service life of the bearing 10.

Figure 27:
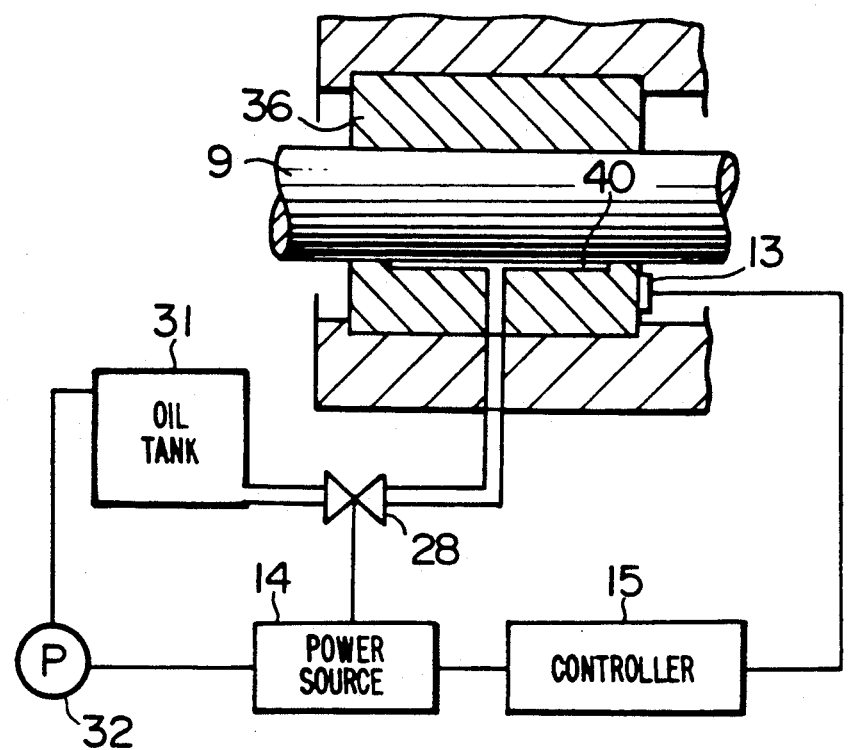

FIG. 27 shows an embodiment in which the machine element is a sliding bearing 36 and the tribo-coating source is oil. A pressure pump 32 and a valve 28 are actuated by an electrical power source 14 which is in turn controlled by a controller 15 on the basis of a signal output from a sensor means, e.g., a temperature sensor 13. When the state of lubrication of the bearing 36 deteriorates, the temperature of the bearing 36 rises. Therefore, if the valve 28 and the pressure pump 32 are actuated at a certain temperature, this makes it possible to assure a long service life of the sliding bearing 36.

Figure 28:
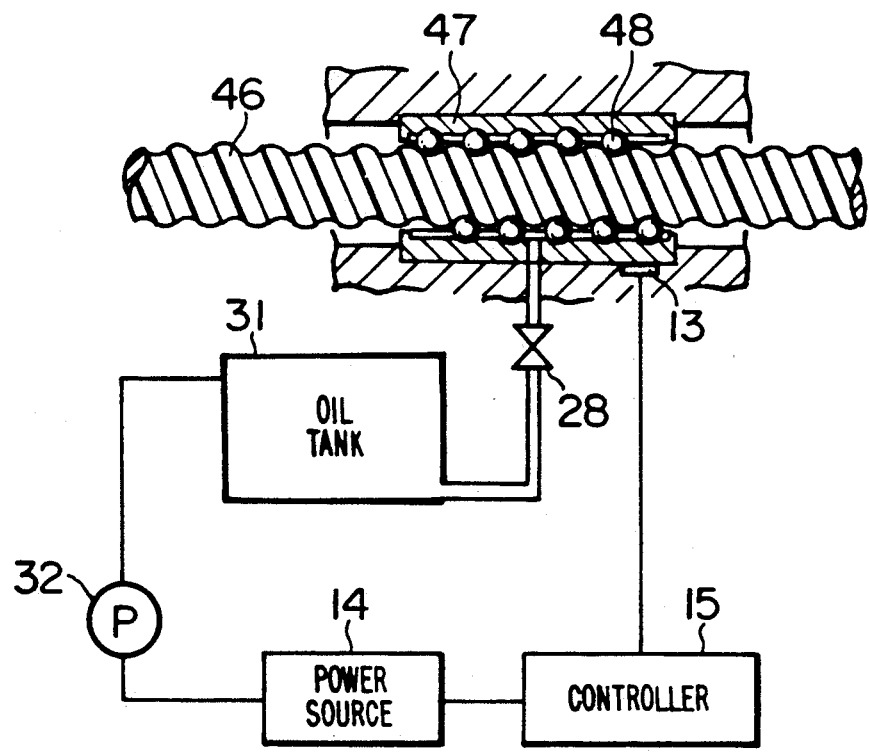

The supply of oil described with reference to FIG. 27 may also be applied, as a tribo-coating method, to the case where the machine element is a ball screw 46, as shown in FIG. 28. The supply of oil effected in this case also enables the achievement of a long service life of the ball screw 46.

The embodiment shown in FIGS. 29 to 32 differ from the foregoing embodiments in that the tribo-coating of the machine element is effected by a method of and an apparatus for coating lubricant by pressing a solid lubricant.

Figure 29:
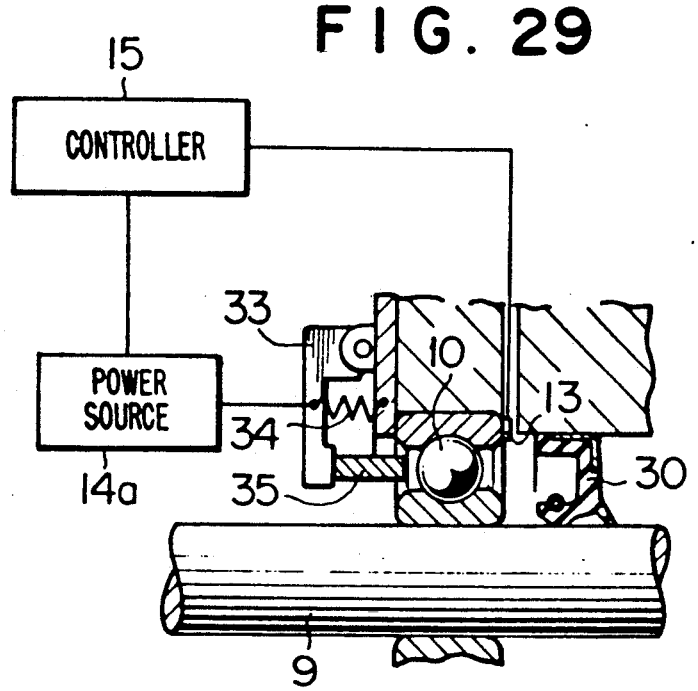
Figure 30:
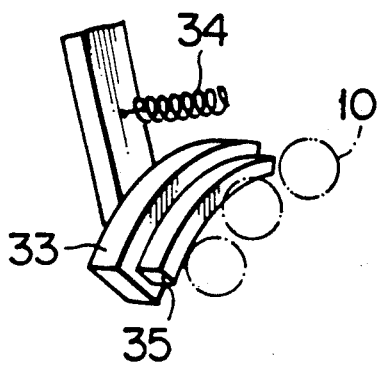

In the embodiment shown in FIGS. 29 to 30, the machine element is a ball bearing 10. A heating power source 14a for heating a spring 34 formed of a shape memory metal is controlled on the basis of the level of a signal from a sensor 13 which may be a temperature sensor or a vibration detector. When the spring 34 formed of a shape memory metal and connected to an arm 33 contracts, a solid lubricant 35 is pressed against the balls 10 of the ball bearing 10 so as to coat lubricant therefrom. Alternatively, a mechanism for driving the solid lubricant 35 may include a motor or a piston which drives a pressing arm 33. FIG. 30 shows, on an enlarged scale, the solid lubricant 35 and the associated driving portion in FIG. 29. Although in the illustrated example, the solid lubricant 35 is circular-arc, it may alternatively be ring-shaped. This embodiment enables solid lubricant to be applied in a coating on a rotary body 10 as required thereby enabling the achievement of a ball bearing possessing a high level of reliability and a considerably long service life.

Figure 31:
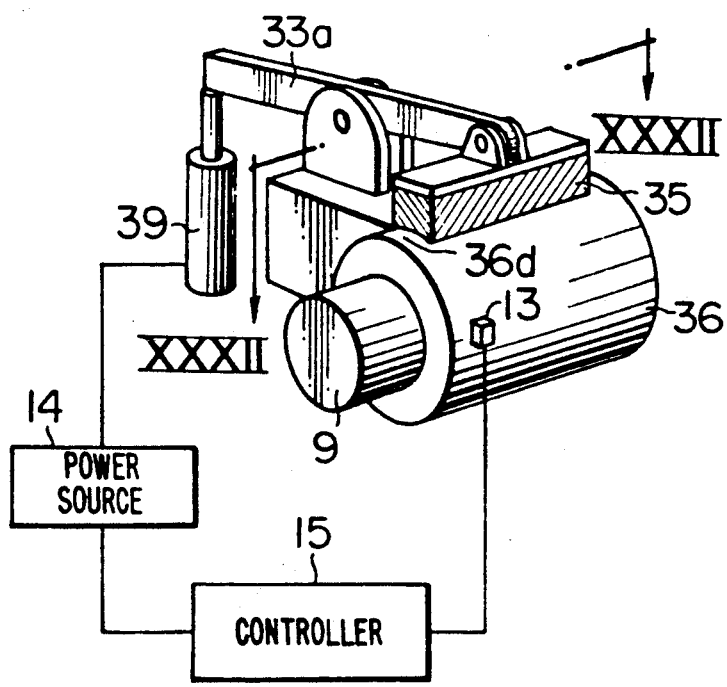
Figure 32:
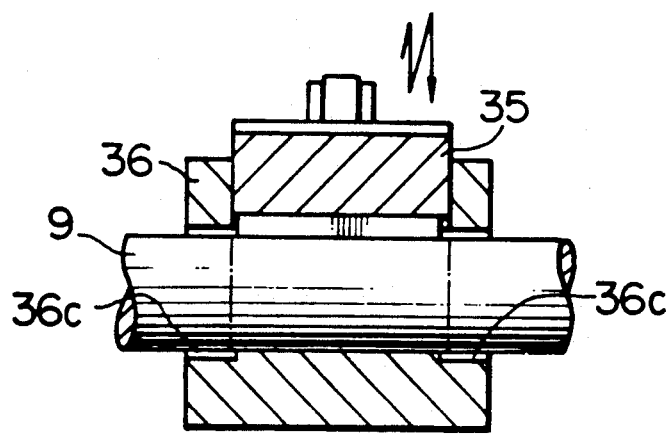

FIGS. 31 and 32 show an embodiment in which the machine element is a sliding bearing 36, and a tribo-coating method effects the pressing of a solid lubricant and coating lubricant therefrom. When one end of a pressing arm 33a is pushed by a pressure piston 39, a solid lubricant 35 fixed to the other end of the pressing arm 33a is pressed against the surface of a rotary shaft 9 so that lubricant from the solid lubricant 35 is coated thereon as the shaft 9 rotates. As shown in FIG. 32, relief passages 36c are formed in certain portions of the sleeve or bush 36 of the bearing which are adjacent to the edges to the solid lubricant 35 on either side thereof. This arrangement enables the surface of the rotary shaft 9 to be coated over the full axial length of the bearing 36 with lubricant from the solid lubricant 35 whose axial length is shorter than that of the bearing sleeve 36.

Thus, the embodiment shown in FIG. 31 and 32 makes it possible to coat lubricant from the solid lubricant 35 over the full axial length of the sliding bearing 36 as required while the state of lubrication of the bearing 36 is being monitored by means of a sensor means 13 such as a temperature sensor, a vibration detector or a torque detector, thereby ensuring steady motion for a long time In this embodiment, the groove formed in the bush 36 of the slidinq bearing to receive the solid lubricant 35 does not extend over the full axial length of the bush 36, but the groove extends in such a manner that bridge portions 36d are formed at either end of the groove. By virtue of the provision of the bridge portions 36d, the bush 36 possesses an increased level of strength so as to be able to act stably as a bearing. The bush configuration shown in FIG. 32 may also be adopted in any of the foregoing embodiments shown in FIGS. 8, 9 and 24.

Figure 34:
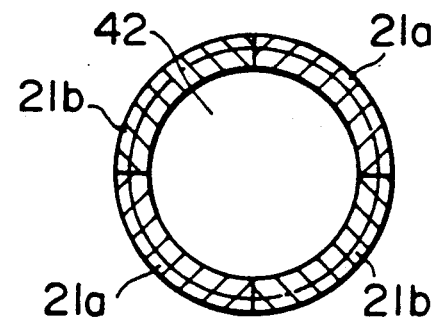
FIGS. 33 and 34 illustrate an embodiment of a lubricant supply apparatus according to the present invention, in which a gear serving as the machine element is combined with a dummy gear, FIG. 34 being a longitudinal sectional view of the dummy gear shown in FIG. 33.
Figure 33:
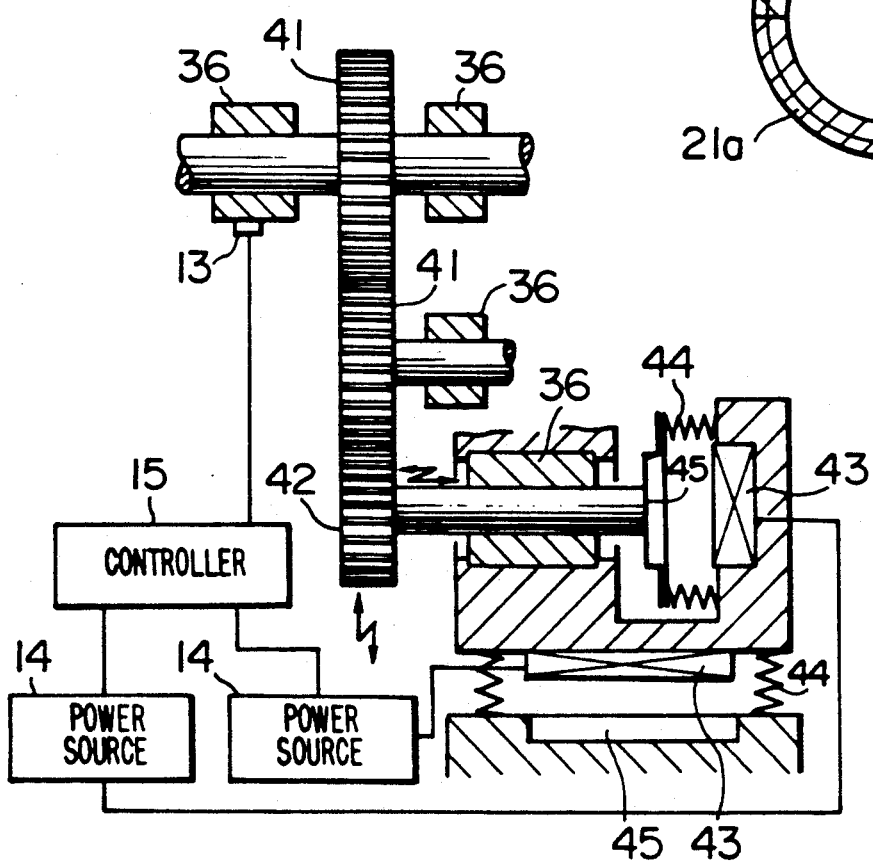

In the embodiment shown in FIG. 33, in a gear mechanism of a machine, a dummy gear 42 which does not take part in the transmission of power has either its surface portion capable of coming into meshing engagement with another gear or its entire structure formed of a solid lubricant. The dummy gear 42 is brought into meshing engagement with a gear 41 taking part in the transmission of power in response to a signal from a sensor means 13 so as to coat lubricant from a solid lubricant. In the illustrated example, the dummy gear 42 is driven in an axial direction and a radial or the circumferential direction by the attractive force of an electromagnet 43 controlled by a controller 15. When the direction in which the dummy gear 42 is driven is adjusted, it is possible to coat lubricant in the optimum condition on the portion of the gear 41 at which it is in meshing engagement. The dummy gear 42 may alternatively be driven by force generated by a motor or a pressure piston. The above-described lubrication enables the achievement of a long service life of the gear 41. The dummy gear 42 may have an arrangement shown in FIG. 34, in which a surface portion of the dummy gear 42 is formed of solid lubricants 21a and 21b of different types that are arranged in the circumferential direction. If the number of teeth of the dummy gear 42 and that of the gear 41 in meshing engagement therewith suitably differ from each other, it is possible to coat a mixture of different solid lubricants 21a and 21b on the gear 41, thereby achieving enhanced level of lubrication.

As has been described above, according to the present invention, lubricant can be supplied and supplemented to the relevant machine element in accordance with necessity. Therefore, it is possible to ensure for a long time the stable operation of machine elements used in relatively inaccessible places.

What is claimed is:

1. A method of supplying lubricant, the method comprising the steps of:
   providing a lubricant supply means for supplying lubricant to t least one element of a machine, the lubricant supply means comprising a vacuum deposition source formed of a solid lubricant, an electrical power source for operating said lubricant supply means, a controller for controlling aid electrical power source, and a sensor for detcting a state of the at least one element of the machine;
   causing said controller to determine, in dependence upon a detected value of said sensor, whether a supply of lubricant to the at least one element of the mchine is required;
   causing said controller to drive said electrical power source upon a determination of a required lubrication; and coating the lubricant on the at least one machine element by evaporating a solid lubricant by a tribo-coating means.

2. A method of supplying lubricant the method comprising the steps of:
   providing a lubricant supply means for supplying lubricant to at least one element of a machine, an electrical power source for operating said lubricant supply means, a controller for controlling said electrical power source, and a sensor for detecting a state of the at least one element of the machine;
   causing said controller to determine, in dependence upon a detected value of said sensor, whether a supply of lubricant to the at least one element of the machine is reqired;
   causing said controller to drive said electrical power source upon a determination of a required lubrication; and
   caoting the lubricant on the at least one machine element by evapoating a solid lubricant by a tribo-coating means,
   wherein said controllwer communicates through a communication means with a remote controller, monitors the state of the at least one machine element, and determines that lubricant should be supplied to the at least one machine element when the supply of lubricant is required.

3. A method of supplying lubricant to a machine component part in motion comprising the steps of:
   monitoring the condition of the machine element by means of a sensor; and
   supplying lubricant in accordance with the state of the machine element by evaporating a solid lubricant by a tribo-coating means.

4. An apparatus for supplying lubricant comprising:
   a tribo-coating means for supplying a solid lubricant to an element of a hamchine;
   an electrical power source for operating said tribo-coating means so as to cause an evaporation of the solid lubricant and coating of the element of the machine; nd
   a controller for driving said electrical power source at predetermined intervals of time.

5. An apparatus for supplying lubricant according to claim 4, wherein said controller change, at arbitrarily determined intervals of time, the electrical power supplied by said electrical power source to said tribo-coating means.

6. An apparatus for supplyng lubricant comprising:
   a tribo-coating means for supplying a solid lubricant to an element of a machine; 'an electrical power source for opeating said tribo-coating means so aso to cuase an evaporation of the solid lubricant and coating of the element of the machine;
   a controller for driving and controlling said power source; and
   a sensor for monitoring an operating state of the machine element and for generating signals forming an input to said cntroller.

7. An apparatus for supplying lubricant according to claim 6, further comprising a switching device disposed in a circiut connecting said controller and said sensor for turning on and off said circiut.

8. An apparatus for supplying lubricant according to claim 6, wherein said controller is a remote controller capable of performing remote contro.

9. Appartus for supplying lubricant, the apparatus comprising:
   a lubricant supply means for supplying lubricant to an element of a machine, the lubricant supply means comprising a vacuum deposition source formed of a slid lubricant, and aheating means for heating and evaporating said lubricant so as to effect vacuum deposition, said heating means including at least one of a laser beam, and electron beam and a heater;
   an electrical power source for operating said lubricant supply means;
   a controller for driving and controlling said power source; and
   a sensor for moniotoring an operating state of the machine element and for generating signals forming an input to said controller.

10. An apparatus for supplying lubricant accrding to claim 9, wherein the machine element incudes a ball bearing, and wherein said solid lubricant is disposed on at least one of an inner ring and an outer ring of said ball bearing.

11. An apparatus for supplying lubricant according to claim 6, wherein said lubricant supply means comprises an ion gun.

12. An apparatus for supplying lubricant according to claim 6, wherein said sensor for minotiring the operating state of the machine element comprises a temperature sensor.

13. An apparatus for supplying lubricant according to claim 6, wherein said sensor for minotiring the operting state of the machine element comprises a vibration detector.

* * * * *